(12) United States Patent
Anderson et al.

(10) Patent No.: US 6,311,161 B1
(45) Date of Patent: Oct. 30, 2001

(54) SYSTEM AND METHOD FOR MERGING MULTIPLE AUDIO STREAMS

(75) Inventors: Richard Eugene Anderson, Jericho, VT (US); Eric M. Foster; Dennis Edward Franklin, both of Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,919

(22) Filed: Mar. 22, 1999

(51) Int. Cl.[7] ................................................. G10L 19/00
(52) U.S. Cl. ........................................... 704/500; 704/212
(58) Field of Search .................................... 704/200, 201, 704/500, 220, 200.1, 501, 502, 503, 504, 212, 223

(56) References Cited

U.S. PATENT DOCUMENTS

| | | | |
|---|---|---|---|
| 4,603,417 | 7/1986 | Shirasu et al. | 370/62 |
| 4,606,021 | 8/1986 | Wurst | 370/62 |
| 4,648,089 | 3/1987 | Hsing | 370/62 |
| 4,831,618 | 5/1989 | Bruce | 370/62 |
| 5,539,741 | 7/1996 | Barraclough et al. | 370/62 |
| 5,703,794 | 12/1997 | Heddle et al. | 364/514 R |
| 5,706,335 * | 1/1998 | Hinderks | 379/93 |
| 5,792,971 * | 8/1998 | Timis et al. | 84/609 |

FOREIGN PATENT DOCUMENTS

| | | | | |
|---|---|---|---|---|
| 0 817 045 A2 | * | 1/1998 | (EP) | G06F/9/46 |
| 09258754 A | * | 10/1997 | (JP) | G10H/1/00 |

OTHER PUBLICATIONS

IBM Technical Disclosure Bulletin, "Resource Management System for Multimedia Devices", vol. 36, No. 09B, (Sep. 1993), pp. 525–529.

* cited by examiner

*Primary Examiner*—Richemond Dorvil
(74) *Attorney, Agent, or Firm*—Heslin & Rothenberg, P.C.; Kevin P. Radigan, Esq.; William H. Steinberg, Esq.

(57) ABSTRACT

A device and method are provided for merging one or more secondary audio channels, received from either a streaming application or from memory, with a primary stream of audio data output from a main audio decoder. In addition to the audio decoder, the device/method employs a controller for processing received secondary audio data in a streaming application, and retrieving from system memory audio PCM data once stored. An audio playback device is provided for formatting the PCM data for mixing with the primary stream of audio data output from the audio decoder. Multiple digital-to-analog converters convert the multiple streams of audio data into analog signals which are then mixed into a single merged audio signal for presentation.

18 Claims, 3 Drawing Sheets

SYSTEM AND METHOD FOR MERGING MULTIPLE AUDIO STREAMS

TECHNICAL FIELD

The present invention relates generally to digital data decoding systems, and more particularly, to a system and method for mixing multiple digital audio streams into a single analog output.

BACKGROUND OF THE INVENTION

Full motion video and audio displays based on digital signals have become widely available. While these displays have many advantages, they also often require a massive amount of raw digital data. Because the storage and transmission of digital video and audio signals is central to many applications, and because an uncompressed representation of a video and audio signal requires a large amount of storage, the use of digital compression techniques is vital to this advancing art.

Several international standards for the compression of digital video and audio signals have emerged over the past decade, with more currently under development. These standards apply to algorithms for the transmission and storage of compressed digital data in a variety of applications, including: video-telephony and teleconferencing; high quality digital television transmission on coaxial and fiberoptic networks; as well as broadcast terrestrially and other direct broadcast satellites; and in interactive multimedia products on CD-ROM, digital audio tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 Standards. The MPEG algorithms have been developed by the Moving Picture Experts Group (MPEG), part of a joint technical committee of the International Standards Organization (ISO) and the International Electro-technical Commission (IEC). The MPEG Committee has been developing standards for the multiplex, compressed representation of video and associated audio signals.

Briefly summarized, the MPEG-2 standard describes an encoding method that results in substantial bandwidth reduction by a subjective lossy compression followed by a lossless compression. The encoded, compressed digital data is subsequently decompressed and decoded in an MPEG-2 compliant decoder.

Video and audio decoding in accordance with the MPEG-2 standard is described in greater detail in commonly assigned U.S. Pat. No. 5,576,765, entitled "Video Decoder", as well as commonly assigned pending application Ser. No. 09/046,283, entitled "Method To Play Audio And Video Clips Through MPEG Decoders". This patent and application are hereby incorporated herein by reference in their entirety.

Audio/video decoders are typically embodied as general or special purpose processors and memory. Decoders that are used with television sets are often referred to in the industry as set-top box (STB) systems.

Stand-alone audio/video decoders currently used in STB systems generally utilize a dedicated interface to a specific transport chip and/or network interface module (NIM). As the required utility of these STB systems expands, it is becoming desirable to adopt input from various sources in addition to the base network (e.g., cable/satellite) connection.

For example, in addition to a main audio stream, such as a soundtrack for a movie, it may be desirable for the transport stream carrying the program to also contain a secondary audio stream or channel that provides, e.g., additional narrative for disabled viewers who are unable to hear subtle sounds in the original soundtrack. Alternatively, it may be desirable to allow a user to run other functions in the background and request audio queues when certain events have occurred, such as receiving mail, etc. Further, it may be desirable to allow an internet browser or other interactive application to run in the foreground, with primary audio and video programming (e.g., a movie) running in a window on the display. In such cases, it is desirable that the secondary or supplementary audio sound be mixed with the original audio stream so that both can be heard at a single time through a common set of speakers, as opposed to mixing the two streams where only one or the other is heard.

As an additional consideration, in order to accomplish decoding of multiple audio streams, the base audio decoder function would conventionally be replicated for as many digital audio streams as output is desired. However, this could be costly and unnecessary in many potential audio mixing applications such as those noted above.

Therefore, in order to establish commercial advantage, there is a need for an integrated device capable of decoding and merging multiple independent digital audio streams using a single base audio decoder. The present invention is directed to meeting this need.

DISCLOSURE OF THE INVENTION

Briefly described, the present invention comprises in one aspect a system for mixing multiple audio streams, including a primary stream of audio data and a secondary stream of audio data. The system has an audio decoder for decoding the primary stream of audio data and system memory for holding the secondary stream of audio data as audio pulse code modulated (PCM) data. A controller retrieves the secondary stream of audio data for forwarding to an audio playback macro for formatting. The system also includes a mixer for mixing the output of the audio decoder and the formatted secondary stream of audio data from the playback macro as a merged audio signal.

In another aspect, a method for mixing multiple audio streams is presented which includes: decoding a primary stream of audio data and producing therefrom a decoded primary stream of audio data; retrieving a secondary stream of audio data from system memory, the secondary stream comprising audio pulse code modulated (PCM) data; formatting the secondary stream of audio data for mixing with the decoded primary stream of audio data; and mixing the decoded primary stream of audio data and the formatted secondary stream of audio data for output as a merged audio signal.

To restate, provided herein is a device/method for taking one or more secondary audio channels from either a streaming application or from memory, and playing the secondary channels out in PCM format concurrently with output from a base audio decoder for analog mixing thereof into a single audio stream. This single audio stream is achieved without the need for multiple base audio decoders or other external components to create the second digital audio output stream to be mixed with the primary stream.

The solution presented herein advantageously employs a generic programming interface. The second audio stream can be either a static file in memory or result from a streaming application, e.g., received as network input. In addition, the secondary audio stream can be received directly as a PCM file, or it can be the result of processing (decoding, etc.) by the system processor. Still further, since two or more audio streams are converted to analog format and then mixed in the analog domain, there is no restriction on the sample frequency associated with the original digital input, and no complex sample rate conversion is required.

DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

The above-incorporated patent application entitled "Method To Play Audio And Video Clips Through MPEG Decoders" describes a technique for operating a digital data encoder wherein a first stream of encoded data is transmitted to the decoder, and a second stream of encoded data is stored in a memory device. One of the first and second streams of encoded data is selected, and the decoder is used to decode that selected stream of encoded data. The second stream of data could have been placed in the memory device by other devices or processes present in a set top box (STB) system. In such a case, all the decoder needs to process the data is a pointer to it and some additional information about it, for example, its size. Since the processor has access to all memory, it can do any necessary parsing/manipulation required by the stream format. This provides a large degree of flexibility. The processor can then pass location and attributes of data to the decoder. This also minimizes data movement to/from memory, reducing bandwidth requirements.

As a further extension of the teachings of this patent, presented herein is a device capable of decoding as needed and merging two or more independent digital audio streams using a single base audio decoder circuit. As one example, described below is an integrated device which employs a small, streamlined formatting macro that can be used for general playback of audio pulse code modulated (PCM) data streams and files. Specifically, the design described herein provides a direct memory access (DMA)-like control interface that can be used to setup the continuous reading of input files or streams when run dynamically as described in the above-summarized patent application. As data is received in the PCM channel macro, it is buffered, formatted for a digital, serial interface as common in the industry (e.g., the I²S interface) and output using a high speed sample clock that can be provided by one of multiple sources (described below). Since the input format of at least the secondary stream of audio data is assumed to comprise an audio PCM stream, it can be provided as a stored clip, a running PCM stream, or the result of decoding by the host controller particularly in the case of relatively low complexity compression techniques used for voice-grade audio.

Figure 1:
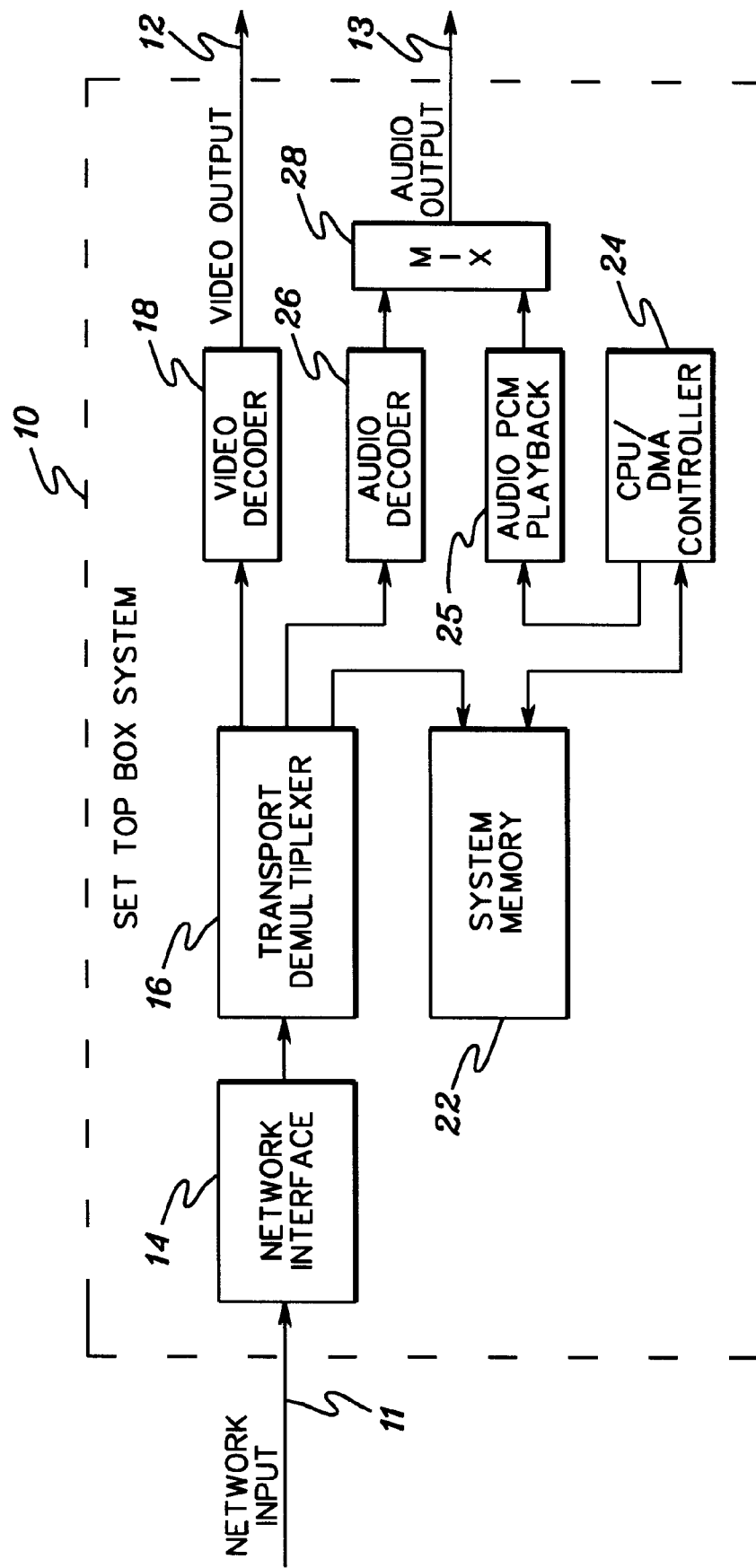
FIG. 1 is a block diagram of one embodiment of a set top box system in accordance with the principles of the present invention.

FIG. 1 depicts one example of a set top box (STB) system implementation, generally denoted 10, in accordance with the principles of the present invention. STB system 10 receives a combined video and audio network input signal 11 at a dedicated network interface 14 which forwards the multiplexed digital signal to a transport demultiplexer 16. Demultiplexer 16 separates the received signal into a stream of video data which is fed to video decoder 18, a first stream of audio data, shown fed to audio decoder 20, and a second stream of audio data, which is placed in system memory 22 as directed by a central processing unit 24, and optionally transferred by a DMA controller 24. In a streaming application, this second audio stream is first processed by controller 24 into a pulse code modulated (PCM) stream and then stored in system memory as audio PCM data. This stored data is retrieved by CPU/DMA controller 24 in a manner dictated by the application.

As explained further below, in accordance with the principles of the present invention an audio PCM playback macro 25 is provided for formatting the secondary audio PCM data retrieved from system memory 22 for mixing with the primary, uncompressed audio PCM signal output from audio decoder 20. Depending upon the implementation, if the secondary stream of audio data is received from demultiplexer 16 in compressed form, then as noted the CPU/DMA controller 24 uncompresses the stream prior to storage thereof in system memory 22. Software decompression of audio data is well known in the art, e.g., decompression of voice-grade compressed audio, and therefore readily implementable by one skilled in the art. Output from audio decoder 26 and audio PCM playback macro 25 is fed to a mixer 28 for merging of the two audio streams into a single audio output signal 13. Output from video decoder 18 comprises the decoded video signal 12. Signals 12 and 13 are then sent, for example, to a television for presentation to a viewer. Note that when used in multichannel audio systems there can be multiple instances of the PCM playback macro to allow mixing with more than two audio channels.

By way of example, the secondary stream of audio data could comprise an independent source of audio received through the network input and demultiplexed by transport demultiplexer 16 into an independent audio channel, which if uncompressed PCM data is sent directly to system memory with a series of queue controls. If compressed, the CPU or DMA controller 24 takes the received audio stream and constructs therefrom a PCM file which is then placed back into system memory. In another embodiment, system memory 22 could be nonvolatile memory that is preconfigured with a variety of PCM sound files stored for different types of user applications. For example, one PCM file could be employed to indicate that e-mail has arrived or as a reminder of an upcoming event. Irrespective of how the PCM file is obtained, the data preferably resides at least temporarily within system memory, which functions as a buffer for the data and thereby accommodates differences in input and output data rates.

In accordance with the principles of the present invention, this PCM audio data is merged with the main audio output of the decoder for simultaneous presentation to a user. More particularly, the PCM file comprising the secondary audio data is converted by audio PCM playback macro 25 into a format which can be combined with the main audio output of base decoder 26 as a single merged audio output for playing over a common set of speakers.

By way of further details, the present invention can be used to implement a set top box (STB) system which allows simultaneous playback of a PCM audio stream while, e.g., an MPEG decoder macro is playing a main audio stream. Both the PCM playback macro and the MPEG decoder macro output in one embodiment separate format audio streams. These streams are separately converted to analog signals by, e.g., external digital-to-analog converters (DACs) (see FIG. 2), and the analog signals are then mixed in analog form and output from the STB system as a single merged audio signal. The result is the ability to mix or overlay one or more secondary audio outputs with the primary output from the audio decoder, even when the sample rates and sample widths of the two streams are different. Again, this decoding/mixing system is advantageously accomplished using a single audio decoder circuit.

The PCM macro is a slave function within the integrated system in one instance. Alternatively the PCM macro could be implemented as a discrete function coupled to a decode system. As a further alternative, the PCM macro could be a master function and retrieve data directly from system memory, in which case a DMA controller would not be needed. The DMA controller 24 (FIG. 1) sends data to the PCM macro from system memory 22. In one instance, data from memory is sent in 16 byte bursts for efficiency, stored in internal buffers within the PCM macro and played through a digital serial output port. The digital-to-audio converter (DAC) clock governing the output rate of the digital, serial port can be programmed to come from one of several possible sources, including an external clock source, an existing audio decoder clock (26), i.e., in the case where the sample rates of the primary and secondary streams match, or from a second audio phase lock loop (PLL) (not shown) added to the integrated device comprising the PCM macro and decode system.

As an option to be considered, the PCM macro may also contain an IEC 958 interface receiver, so that the macro can directly receive an IEC 958 stream from an external source and play it through the digital, serial output port. This arrangement would allow the set top box to have an input port from another system that plays the stream through the set top's audio system. Since the IEC 958 input is a single input, the clock will need to be recovered. Digital clock recovery techniques can be used to gather the bit information given the assumed low speed data rate. However, full clock recovery of the IEC 958 clock for subsequent use by the DAC (the IEC 958 clock is the over sampling clock rate for the stream) requires analog techniques such as a phase lock loop.

Figure 2:
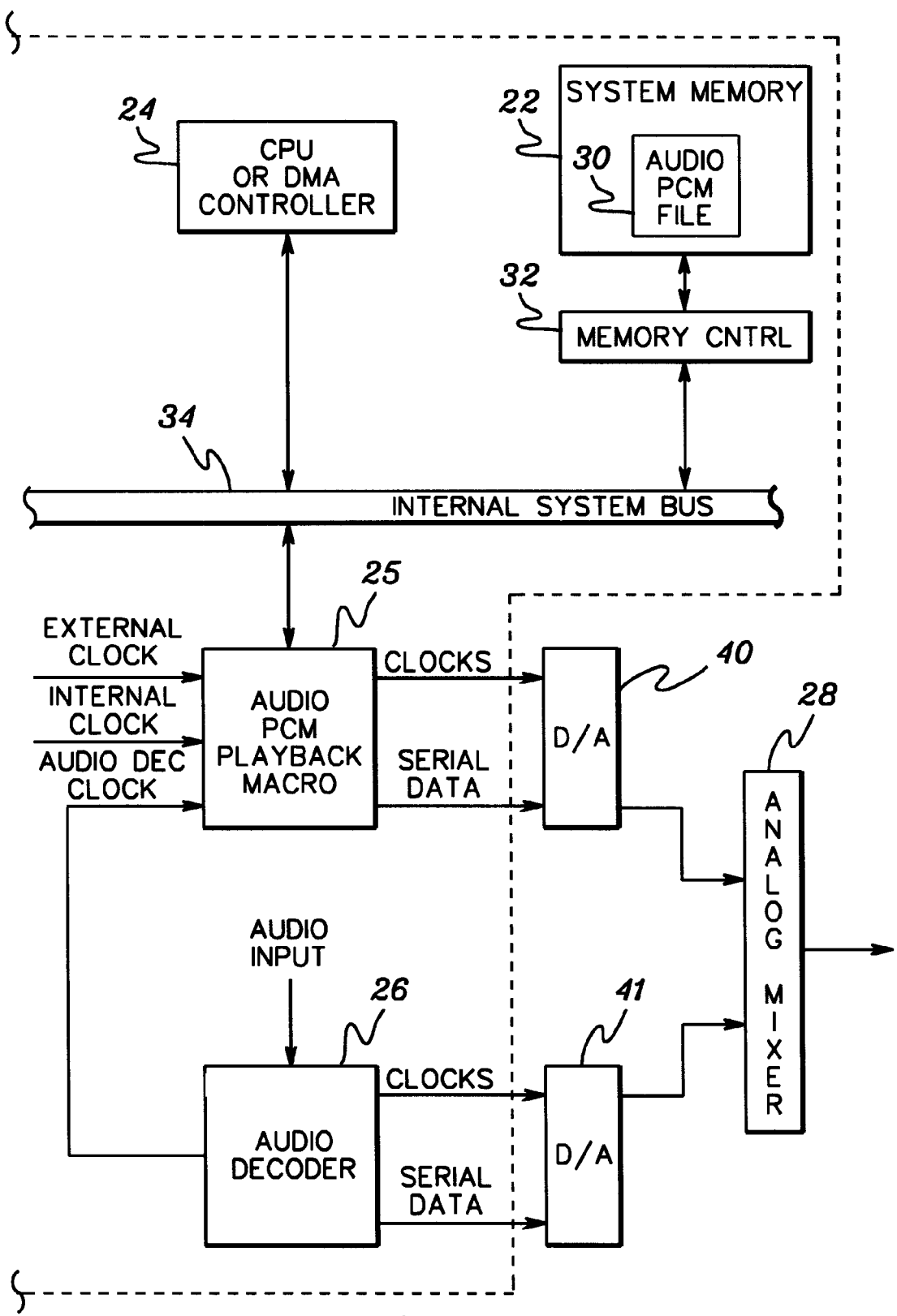
FIG. 2 is a block diagram of one embodiment of the set top box system of FIG. 1 showing the connections between system memory 22, CPU/DMA controller 24, audio PCM playback macro 25 and audio decoder 26 in greater detail, including the mixing of analog outputs by mixer 28.

FIG. 2 depicts in greater detail one embodiment of STB system 10 in accordance with this invention. An audio PCM file 30 resides within system memory 22. Memory 22 is accessed through a memory controller 32 by CPU or DMA controller 24. Controller 24 forwards the selected audio PCM file 30 from system memory to audio PCM playback macro 25 across an internal system bus 34. Macro 25 is shown to have three clock inputs, i.e., a clock that is external to the integrated circuit containing the playback macro, alternatively, a clock that is internal to the circuit containing the playback macro, and an audio decoder DAC clock input received from audio decoder 26. Audio DAC clock is the same clock employed by the audio decoder in the case where the sample rates of the two streams match.

Serial digital data is output from audio PCM playback macro 25, e.g., in I²S format, as well as the associated clocks. These signals are fed to a digital-to-analog converter 40 for conversion to an analog signal. This analog signal is then fed to analog mixer 28. Similarly, serial data output from audio decoder 26 and its associated clocks is fed to a second digital-to-analog converter 41 whose output is also fed to analog mixer 28. The two I²S outputs are preferably converted to analog signals through the set of DACs and then mixed in the analog domain since analog mixing of signals is well-known. The single merged audio signal is output from the analog mixer 28 for presentation to a user.

Figure 3:
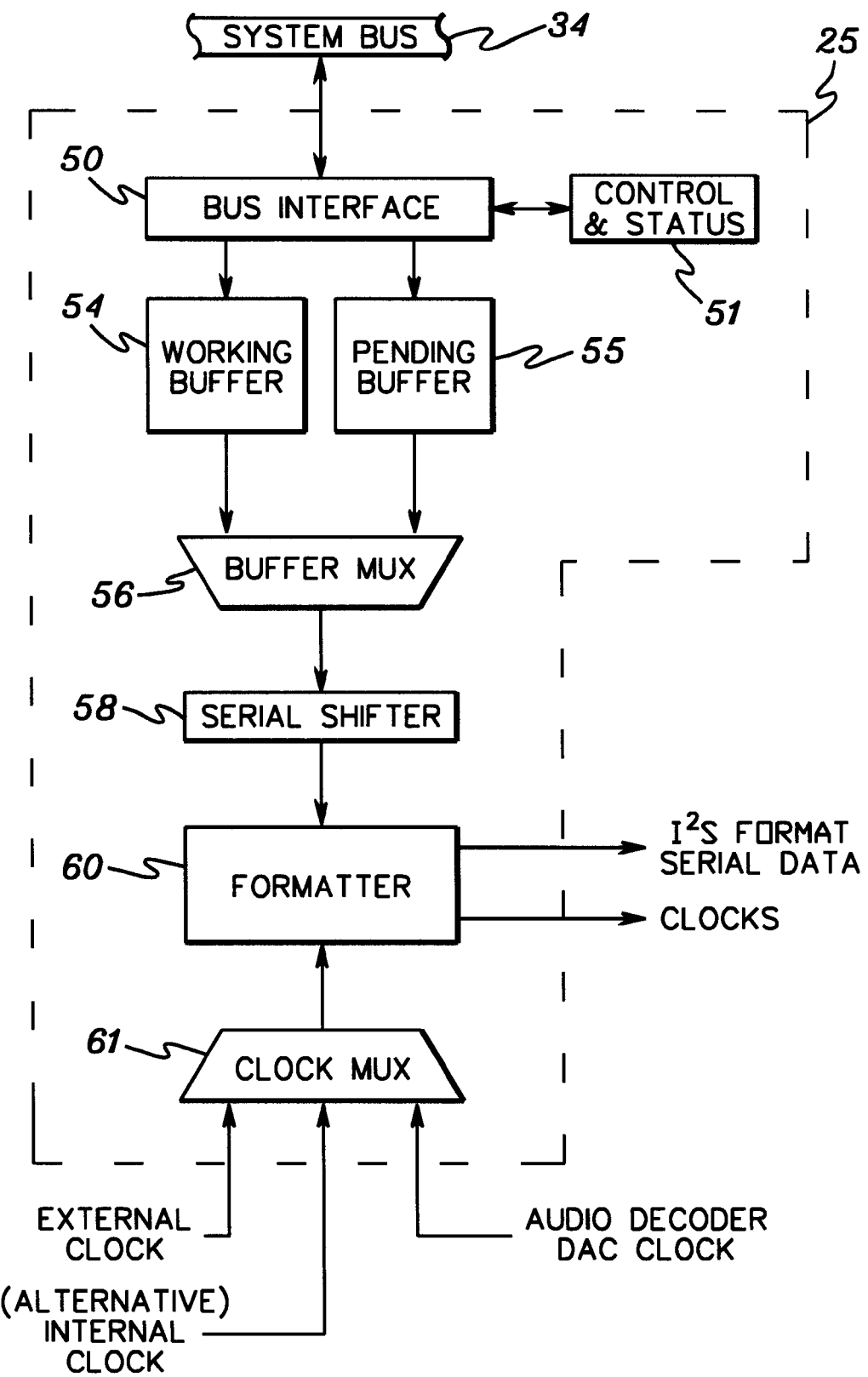
FIG. 3 is a block diagram of one embodiment of audio PCM playback macro 25 of FIG. 2 in accordance with the principles of the present invention.

FIG. 3 illustrates one detailed embodiment of the architecture of a PCM playback macro 25 in accordance with the principles of the present invention. Macro 25 receives the secondary stream of PCM audio data across system bus 34. The macro has a slave interface 50 which is a DMA target for the DMA controller 24 (FIG. 2) which sends data, for example in four word bursts from system memory. The bus interface is also used to access internal control and status registers 51 as will be understood by one skilled in the art. Data is initially stored in internal buffers, i.e., working buffer 54 and pending buffer 55. Two buffers are preferably employed so that the DMA controller can be filling one buffer while the other is in use by the PCM playback macro. The width of the buffers can vary depending upon the implementation.

Output from the buffers is multiplexed by buffer mux 56 and supplied to a serial shifter 58. The shifter sends a serial PCM sample stream to a digital, serial formatter 60. Formatter 60 can be readily implemented by one skilled in the art. A clock mux 61 selects the source for the DAC clock employed by formatter 60 to generate the bit clock and left/right sample clock. The optional IEC 958 input would first go through a clock recovery unit (not shown) to generate the bit clock. The data is then stored and parsed (channel status, user data, etc. is available to the host controller). The serial PCM samples are sent to the I²S formatter. Since the DAC clock used by the I²S port may not match the original DAC clock, there will be occasional sample skips and repeats to maintain a proper buffer level.

Below is an initial list of the register information required to implement a PCM macro as described above:
  DMA target requires addressable buffer location
  The digital, serial formatter requires sample bit width, left/right justified, sample frequency (sent to DAC clock source)
  The DAC clock mux requires clock source selection
  The PCM data mux requires data source selection
  The optional IEC 958 receiver requires channel status bits, user bits, auxiliary bits, and receiver lock status.

To summarize, those skilled in the art will note from the above description that a device is provided herein for taking a second audio channel from either a streaming application or from memory, and playing the second channel out in PCM format through a D/A converter concurrently with D/A converted output from a base audio decoder so that the output of the multiple DACs can be mixed into a single analog audio stream. This single audio stream is achieved without the need for multiple conventional audio decoders, thereby reducing the cost and complexity of the resultant system. The playback macro presented herein has a DMA target interface on it and is translating parallel data into a formatted serial stream for output to the DAC. The playback macro is not expanding, compressing or changing the data in any manner other than its formatting. The audio stream played out by the playback macro is assumed to already be in decoded format as a PCM file, e.g., located in system memory. If received as a compressed stream of audio data, the CPU would decompress the stream prior to its storage in memory. The CPU essentially functions as an audio decoder in this streaming example and is implementable as a practical matter provided process intensive decoding is not required. For example, overlay of a voice grade compression/decompression stream of audio data onto a principal stream of audio data would be a reasonable implementation of the device described.

While the invention has been described in detail herein in accordance with certain preferred embodiments thereof, many modifications and changes therein may be effected by those skilled in the art. For example, multiple secondary streams of audio data could be simultaneously merged with a primary stream of audio data, each stream originating with a different source or providing different information content to a user of the system. Accordingly, it is intended by the appended claims to cover all such modifications and changes as fall within the true spirit and scope of the invention.

What is claimed is:

1. A system for mixing multiple audio streams, said system comprising:
    a first audio playback device comprising an audio decoder for decoding a primary stream of audio data, said audio decoder producing a decoded primary stream of audio data in digital, serial format;
    means for retrieving a secondary stream of audio data from system memory, said secondary stream comprising audio pulse code modulated (PCM) data;
    a second audio playback device comprising an audio PCM playback macro for formatting said secondary stream of audio data in digital, serial format for mixing with said decoded primary stream of audio data in digital, serial format; and
    a mixer for mixing said decoded primary stream of audio data and said formatted secondary stream of audio data for output as a merged audio signal.

2. The system of claim 1, wherein said secondary stream of audio data comprises uncompressed audio PCM data.

3. The system of claim 1, wherein said primary stream of audio data and said secondary stream of audio data comprise independent audio streams.

4. The system of claim 3, wherein said mixer comprises an analog mixer, and wherein said system further comprises a first digital-to-analog converter for converting said decoded primary stream of audio data to an analog signal and a second digital-to-analog converter for converting said formatted secondary stream of audio data to an analog signal, said analog mixer being coupled to said first digital-to-analog converter and to said second digital-to-analog converter for receiving said analog signals and producing therefrom said merged audio signal.

5. The system of claim 1, wherein said primary stream of audio data comprises MPEG encoded audio data, and said audio decoder comprises an MPEG audio decoder.

6. The system of claim 1, wherein said system comprises a set top box system.

7. The system of claim 1, further comprising a transport demultiplexer, said transport demultiplexer providing said primary stream of audio data to said first playback device and said secondary stream of audio data to said system memory.

8. A system for mixing multiple audio streams, said system comprising:
    an audio decoder for decoding a primary stream of audio data, said audio decoder producing a decoded primary stream of audio data;
    means for retrieving a secondary stream of audio data from system memory, said secondary stream comprising audio pulse code modulated (PCM) data;
    an audio playback device for formatting said secondary stream of audio data for mixing with said decoded primary stream of audio data;
    a mixer for mixing said decoded primary stream of audio data and said formatted secondary stream of audio data for output as a merged audio signal; and
    wherein said audio playback device further comprises a working buffer and a pending buffer coupled to receive in parallel portions of said audio PCM data, a buffer multiplexer receiving as input audio data read from said working buffer and said pending buffer, a serial shifter coupled to receive output from said buffer multiplexer and produce therefrom a serial PCM sample stream, a formatter coupled to receive said serial PCM sample stream from said serial shifter, said formatter converting said serial PCM sample stream to a digital, serial format, and a clock multiplexer for providing a clock to drive said formatter using one of a plurality of available clock signals.

9. The system of claim 8, wherein said plurality of clock signals comprises at least some of an external system clock signal, an internal system clock signal and a decoder clock signal received from said audio decoder.

10. A method for mixing multiple audio signals, said method comprising:
    decoding a primary stream of audio data and producing therefrom a decoded primary stream of audio data in digital, serial format, said decoding comprising employing a first audio digital playback device comprising an audio decoder;
    retrieving a secondary stream of audio data from system memory, said secondary stream comprising audio pulse code modulated (PCM) data;
    formatting said secondary stream of audio data in digital, serial format for mixing with said decoded primary stream of audio data in digital, serial format, said formatting employing a second audio digital playback device comprising an audio PCM playback macro; and
    mixing said decoded primary stream of audio data and said formatted secondary stream of audio data for output as a merged audio signal.

11. The method of claim 10, further comprising converting said decoded primary stream of audio data to an analog signal and separately converting said formatted secondary stream of audio data to an analog signal, and wherein said mixing comprises mixing said analog signals into said merged audio signal.

12. The method of claim 10, wherein said primary stream of audio data and said secondary stream of audio data have different sample frequencies prior to said mixing thereof.

13. The method of claim 10, wherein said primary stream of audio data and said secondary stream of audio data comprise PCM data with different sample widths.

14. The method of claim 10, wherein said primary stream of audio data and said second stream of audio data comprise independent audio streams.

15. The method of claim 10, further comprising employing a transport demultiplexer to provide said primary stream of audio data to said first audio digital playback device and said secondary stream of audio data to said system memory.

16. A method for mixing multiple audio signals, said method comprising:
    decoding a primary stream of audio data and producing therefrom a decoded primary stream of audio data;
    retrieving a secondary stream of audio data from system memory, said secondary stream comprising audio pulse code modulated (PCM) data;

formatting said secondary stream of audio data for mixing with said decoded primary stream of audio data;

mixing said decoded primary stream of audio data and said formatted secondary stream of audio data for output as a merged audio signal; and wherein said formatting comprises formatting said audio PCM data in digital, serial format, and wherein said decoding comprises outputting said decoded primary stream of audio data as audio PCM data in I²S format.

17. A method for mixing multiple audio signals, said method comprising:

decoding a primary stream of audio data and producing therefrom a decoded primary stream of audio data;

retrieving a secondary stream of audio data from system memory, said secondary stream comprising audio pulse code modulated (PCM) data;

formatting said secondary stream of audio data for mixing with said decoded primary stream of audio data;

mixing said decoded primary stream of audio data and said formatted secondary stream of audio data for output as a merged audio signal; and wherein said formatting comprises initially buffering in parallel portions of said audio PCM data, multiplexing the parallel buffered portions of said audio PCM data, serially shifting output of said multiplexing to produce a serial PCM sample stream, and converting the serial PCM sample stream to a digital, serial format, said converting employing one of a plurality of available clock signals.

18. The method of claim 17, further comprising providing said plurality of available clock signals to include at least some of an external system clock signal, an internal system clock signal and a decoder clock signal employed by said decoding.

* * * * *